Figure 1:
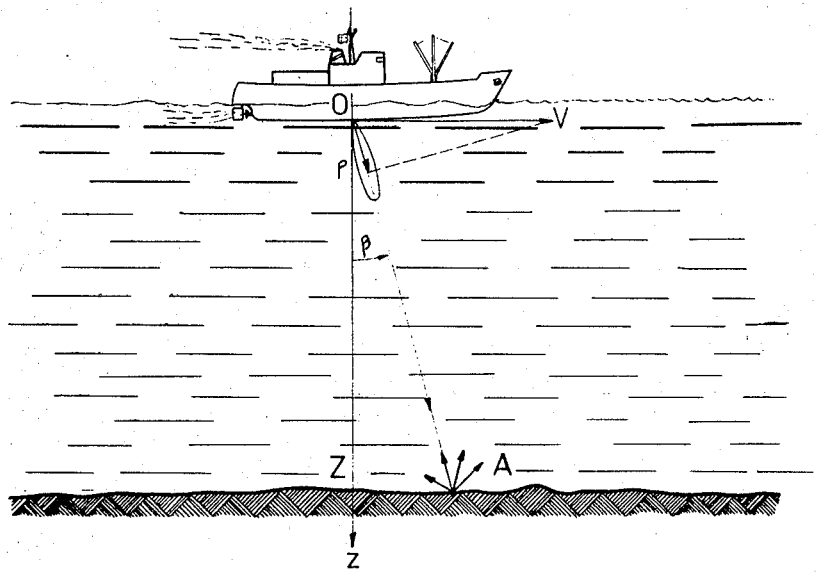

United States Patent [19]
Barret et al.

[11] 3,719,921
[45] March 6, 1973

[54] METHOD BASED ON THE DOPPLER EFFECT FOR DETERMINING THE DISTANCES TRAVELLED OVER BY A VEHICLE AND DEVICE FOR PRACTISING SAID METHOD

[75] Inventors: Jean Pierre Barret, Chambourcy; Max Monnot, Chatou; Jacques Trognee, Rueil Malmaison, all of France

[73] Assignee: Institut Francais du Petrole des Carburants et Lubrifiants, Rueil Malmaison, France

[22] Filed: Jan. 28, 1971

[21] Appl. No.: 110,554

[30] Foreign Application Priority Data

Feb. 2, 1970 France..............................7003645

[52] U.S. Cl. ....................340/3 D, 340/3 E, 343/7.5, 343/9
[51] Int. Cl................................................G01s 9/66
[58] Field of Search .........340/3 D, 3 E; 343/8, 9, 7.5

[56] References Cited

UNITED STATES PATENTS 3,436,721   4/1969   Farr......................................340/3 D Primary Examiner—Richard A. Farley
Attorney—Craig, Antonelli, Stewart & Hill

[57] ABSTRACT

Method for determining the distance travelled over by a vehicle with respect to a reference surface, comprising transmitting towards said surface, in an inclined direction with respect to a vertical line, sequences of $n$ wave trains of a constant length and with a recurrence period of two successive transmission sequences in a constant ratio with the transmission time of a sequence, irrespective of the value of $n$, receiving the waves diffused back from said surface during a reception stage at which the transmission is interrupted, the length of said reception stage depending on the value of $n$, and determining the distance travelled over on the basis of the difference between the frequency of the transmitted waves and that of the received waves.

18 Claims, 8 Drawing Figures

METHOD BASED ON THE DOPPLER EFFECT FOR DETERMINING THE DISTANCES TRAVELLED OVER BY A VEHICLE AND DEVICE FOR PRACTISING SAID METHOD

This invention relates to the determination of the distance travelled over by a vehicle with respect to a reference surface, by making use of informations concerning its velocity as obtained by measuring frequency shifts of acoustic or electromagnetic waves resulting from the so-called DOPPLER-FIZEAU effect.

The invention relates more particularly to the determination of the distance travelled over by a vehicle moving in or on water, with respect to the immersed soil used as reference surface.

Amongst the means used for such a determination in the case of navigation in or on water, there can be mentioned the utilization of logs wherein the logs are obtained by means of revolution counters with helices, directly measuring the distance travelled over with respect to the water body and also by vacuum operated logging means or magnetic logging means measuring the relative velocity of the vehicle with respect to the water body. By integration of the velocity, in the latter case, there is obtained a value of the distance travelled over.

More recent methods have been developed, making use of the well-known DOPPLER effect, according to which the relative velocity of a vehicle is related to the shift between the frequency of an acoustic wave transmitted from the vehicle and that of the wave received after reflection on an obstacle.

One or more transmitting transducers continuously propagate ultra-sonic waves of a steady frequency towards the submerged soil and along oblique directions with respect to the vertical line passing through the vehicle.

One or more receiving transducers, which can be interconnected, receive the back-diffused ultra-sonic waves. These receivers are coupled with a device, for measuring the difference between the frequency of the transmitted wave and that of the received wave and determining the velocity and the distance travelled over by the vehicle.

These devices do not work satisfactorily except when the water depth between the vehicle and the water bottom is relatively small. For reasons of bulkiness, the vibration receivers are in most cases placed in the vicinity of the vibration transmitters and accordingly receive secondary and direct waves from the latter. When the acoustic waves diffused back from the bottom are too weakened, they are hidden by and mixed up with said direct waves.

A known method for avoiding these disadvantages consists of transmitting acoustic waves in a discontinuous manner. The transmission time interval is followed with a receiving time interval or receiving gap, during which the receivers detect only the waves diffused back from the bottom.

The distance between the vehicle and the bottom being not known with accuracy, the travel time forth and back of the transmitted waves is undetermined. The transmission time interval must therefore be chosen short enough for preventing any overlapping at the receiving point between the transmitted waves and their echo. The measurement of the frequency shift due to the DOPPLER effect is performed on wave trains of short duration and is accordingly subject to inaccuracy.

It is an object of the present invention to provide for a navigation method making use of the DOPPLER effect and whereby can be avoided the above-mentioned disadvantages, and a device adapted to the particular requirements for practising the method.

The method according to the invention comprises transmitting waves of a determined frequency towards the reference surface and along an oblique direction with respect to a vertical line, receiving the waves reflected from said surface, converting the received waves to electrical values and determining, during a receiving period, the distance travelled over, making use of the frequency difference between the transmitted and the received waves.

The method of this invention is remarkable in that it comprises the transmission of a series of wave trains of a constant duration $\theta$ and with a predetermined recurrence period.

The transmission is discontinued at the instant of arrival of the waves reflected from the reference surface, the number of the transmitted wave trains being an integer.

The transmission period is accordingly maintained at its maximum value which is compatible with the distance from the vehicle to the reference surface.

The transmission period is followed with a receiving period, the length of which depends on the value of $n$. The accuracy of the measurements carried out on the basis of the received wave trains increases with the length of the transmission period and will accordingly be maintained at an optimal value.

The invention is further characterized in that a constant ratio, independent from $n$, is maintained between the recurrence period $T_{REP}$ of two successive series and the actual transmission time $n\theta$.

The constancy of this ratio makes unnecessary a scale change for the measuring apparatus and precludes any variation in the accuracy of the measurement in relation with the water depth.

In an example of practising the method, the wave train transmission is preceded by a recognition signal whose echo can be easily identified at the reception and there is provided, within the time interval between two successive transmissions of wave trains, a receiving period for detecting the echo of the recognition signal, if any, and for starting the receiving period if such an echo is detected.

Figure 2:
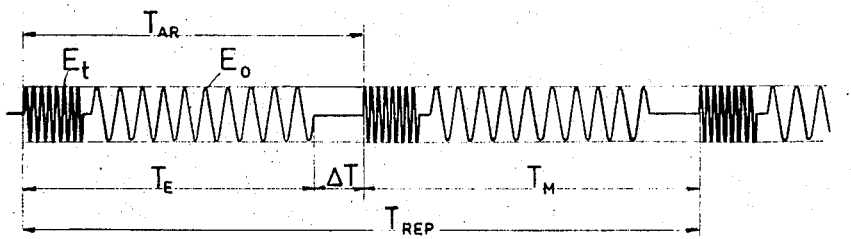
Figure 3:
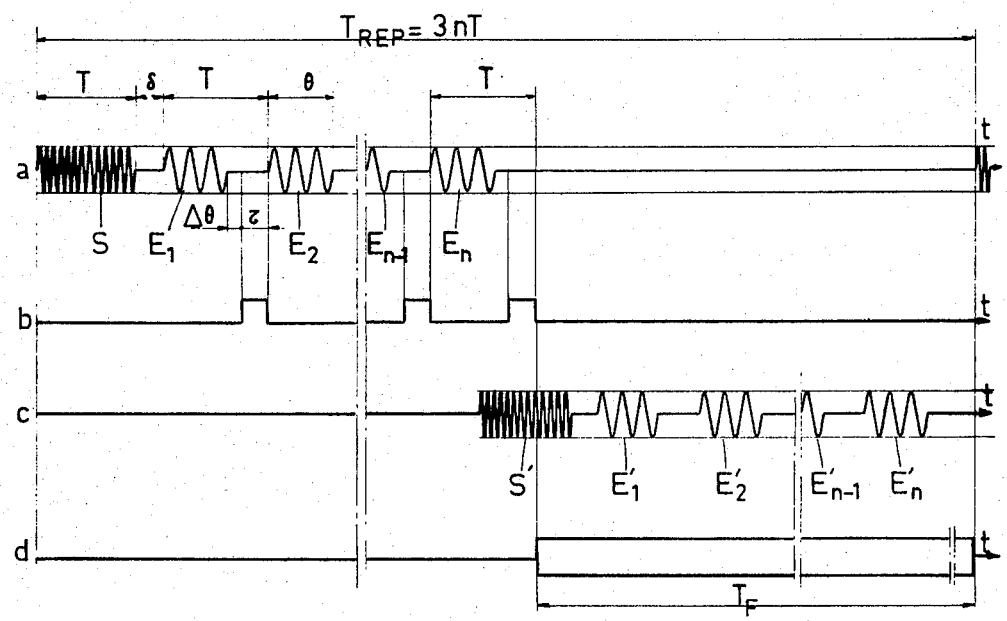
Figure 4:
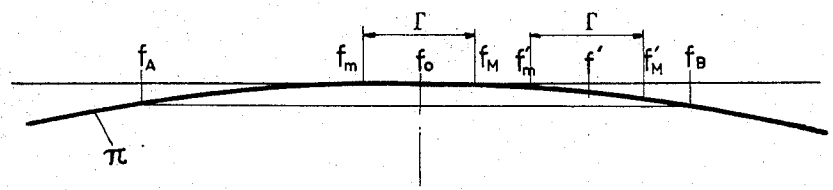
Figure 5:
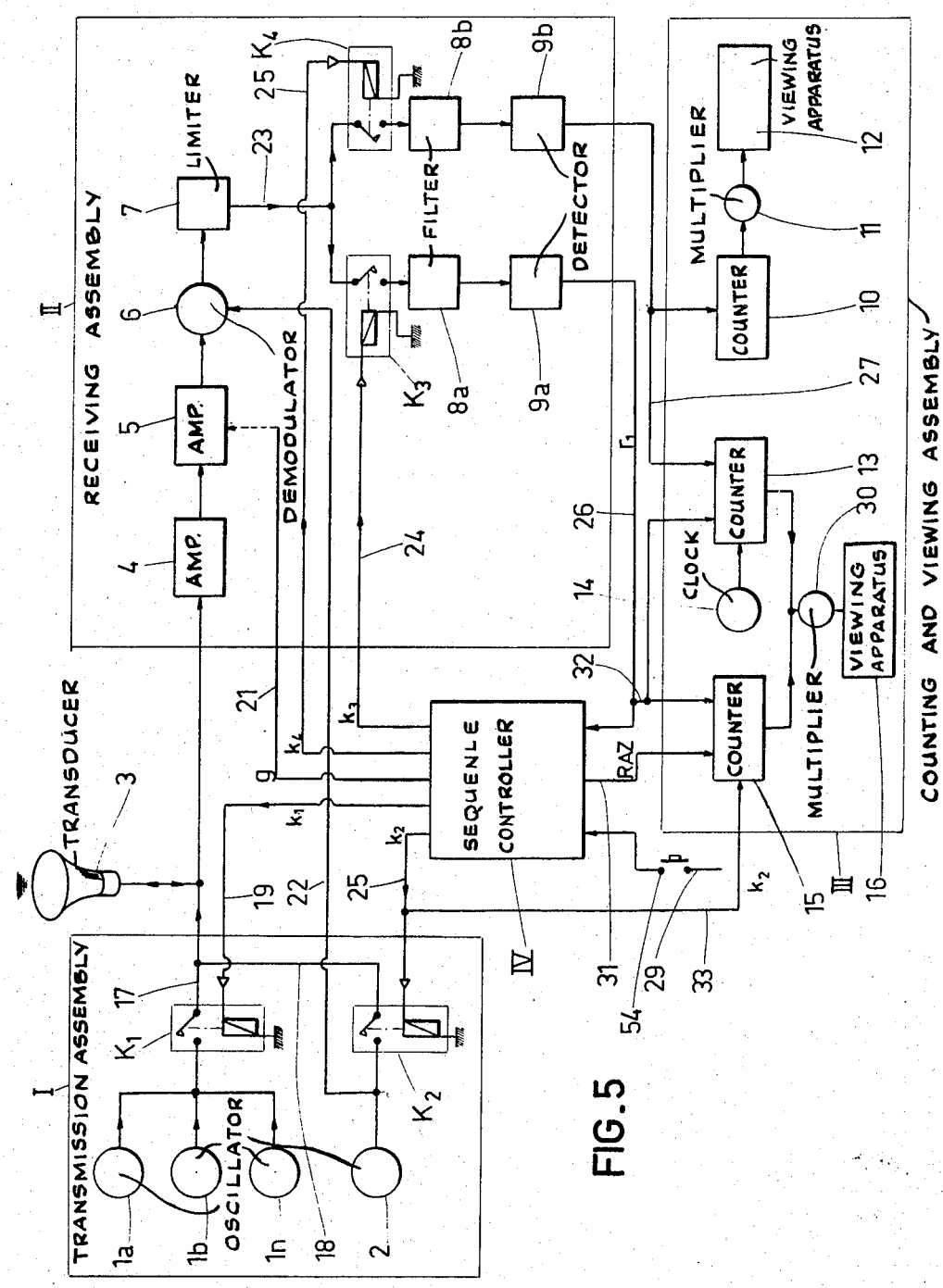
Figure 6:
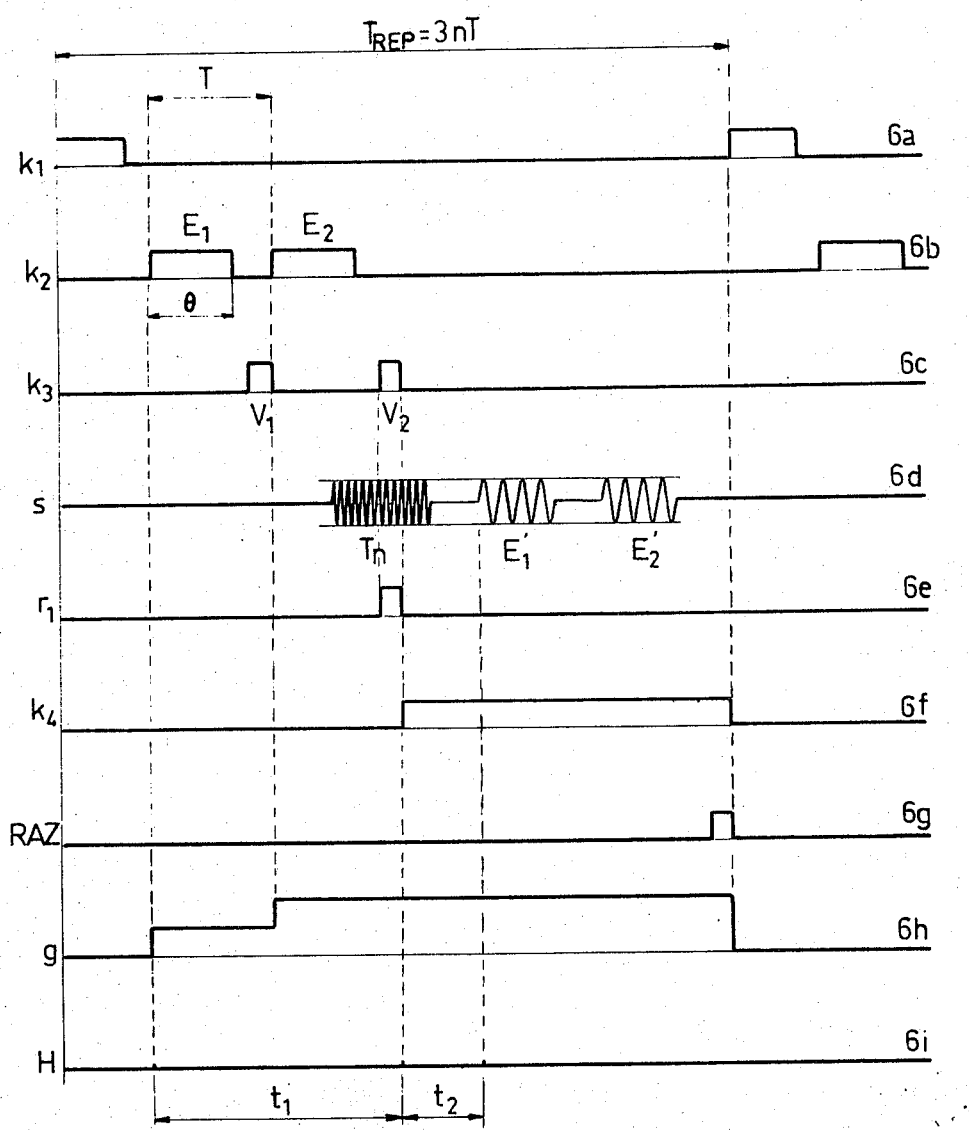
Figure 7:
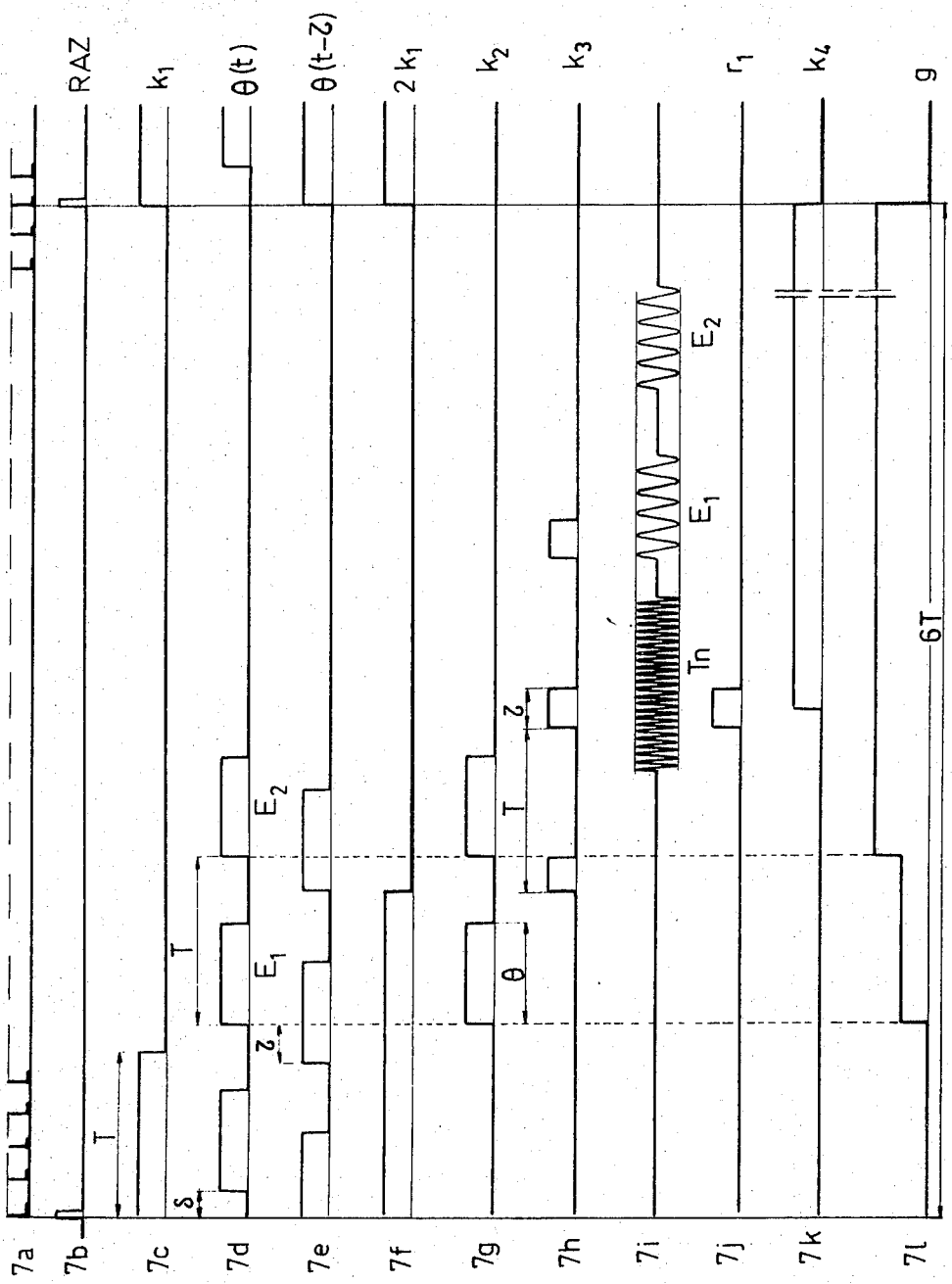
Figure 8:
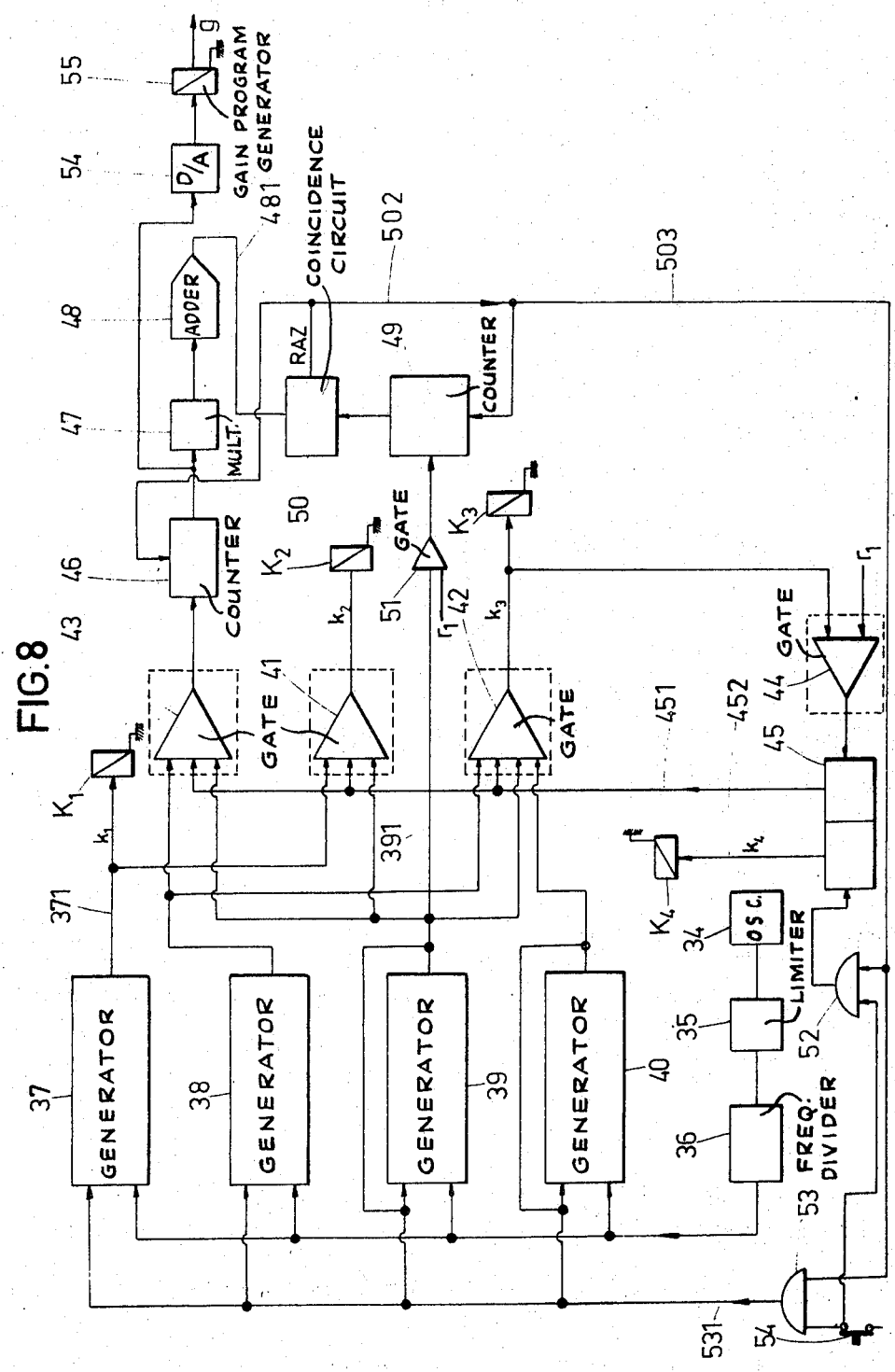

The advantages of the method will be more clearly apparent from the following description, given with reference to the accompanying drawings wherein:

FIG. 1 shows the position of an acoustic wave transmission beam with respect to the vehicle, in the particular case of a marine vehicle, FIG. 2 is a chronogram of a transmission-reception cycle, according to a first embodiment of the method, FIG. 3 shows chronograms of a transmission-reception cycle according to a second preferred embodiment of the method, FIG. 4 shows the position of the transmission frequency of the wave trains and of the transmission frequency of the recognition signal within the passband of the transmitting and receiving transducers, FIG. 5 diagrammatically shows the device for performing the embodiment of the method illustrated in FIG. 3, FIG. 6 shows chronograms of various signals produced for coordinating the operations performed by the device of FIG. 5, FIG. 7 shows the chronograms of the signals produced by the constituting elements of the coordination device illustrated in FIG. 8, and FIG. 8 diagrammatically shows the constituting elements of the device for coordinating the operations performed by the device of FIG. 5.

In FIG. 1 there is shown the position of the transmission beam with respect to the vehicle. The axis of the transmission lobe has an oblique direction with respect to the vertical line Oz, for example a direction toward the head of the vehicle.

Let $\beta$ be the angle between the direction of the transmission beams and the vertical line, $\rho$ the projection of the velocity vector $\vec{V}$ of the vehicle on the axis of the transmission beam and $\Delta f$ the frequency shift between the transmitted waves and the waves received after back diffusion.

We have the following relationship:

$$\rho = \lambda/2 \, \Delta f \qquad (1)$$

$\lambda$ being the wave length of the ultrasonic waves transmitted through water.

The projection $\rho$ being equal to $V \sin \beta$, the velocity of the vehicle is related to $\Delta f$ according to the relationship:

$$V = \lambda/(2 \sin \beta) \, \Delta f \qquad (2)$$

in view of relationship (1).

There can be used a plurality of transmitting transducers and receiving transducers fixed to the hull of a vessel in the particular case of use of a marine vehicle. The transmitting and receiving transducers, at the same or separate locations, may for example be placed, in a known manner, symmetrically with respect to a vertical line, two of them being placed in a plane passing through the rolling axis and two others through the pitching axis.

A first embodiment of the method will be now described with reference to FIGS. 1 and 2.

When the vertical distance Z from the vehicle to the surface diffusing back the waves is known, for example by means of an echo sounder, the transmission time $T_E$ is so adjusted as to have:

$$T_E < 2Z/(\cos \beta)c = T_{AR} \qquad (3)$$

$T_{AR}$ being the travel time forth and back of the acoustic waves in the direction of the beam axis and $c$ being the propagation velocity of the sound in water.

The transmission stage E comprises transmitting a wave train $E_o$ of a frequency $f_o$ preceded by a recognition signal $E_t$ of a frequency different from or equal to $f_o$ and selected within the pass-band of the transmitting and receiving transducers.

This signal $E_t$ will hereinafter be called tonality. This recognition signal may be advantageously composed of a combination of several frequencies $f'_1, f'_2, f'_3 \ldots f'_n$ according to a code or a known modulation.

The receivers are made operative only from time $T_E + \Delta T$. During the time interval $\Delta T$, signals arriving to the receivers consist of parasitic signals resulting from vicinal echos such as those generated by reflections on the water surface, the hull or on a protective dome for the transducers, if any, or may also consist of direct transmissions from the transmitters and due to the remainder of the transmitted wave trains.

As soon as the tonality is received a measuring device is connected to the receiving circuits for a time interval:

$$T_M = T_E + \Delta T \qquad (4)$$

During a further time interval $\Delta T$, are sensed at the receiver all the echos of the waves transmitted along propagation axes different from the main axis of the transmission beam.

The opening angle of the latter is not zero and the beam comprises secondary lobes on both sides of the main lobe. The waves transmitted along directions included in these secondary lobes are subject to DOPPLER frequency shifts different from those observed on the waves transmitted along the main axis and can be used for the statistical measurement of the velocity and the distance travelled over by the vehicle.

During the time interval $T_M$, the measurement device detects the frequency shift resulting from the DOPPLER effect, by synchroneous demodulation and counts, for example, the number of times where the signal has a zero amplitude.

The transmission stage during the time interval $T_E$ is followed with the waiting interval $\Delta T$ and the receiving interval $T_M$ determined by relationship (1) from the exact measurements carried out on $T_E$ and $\Delta T$. The recurrence interval of two successive transmissions is thus:

$$T_{REP} = T_E + DELTA\text{-}HI + T_M \qquad (5)$$

or $$T_{REP} = 2 \, T_M \qquad (6)$$

in view of relationship (4).

Briefly stated, the first embodiment of the method can be summarized by the following operations:

the transmission period $T_E$ is adjusted to the time interval $T_{AR}$ of travel of the transmitted waves forth and back, the DOPPLER frequency shift on the received waves is measured after reception of the tonality, this measurement is carried out over a time interval $T_M$ equal to the transmission time $T_E$ increased by a constant time interval $\Delta T$, the measurement is discontinued and a new transmission phase is initiated with a recurrence period equal to twice the measurement time $T_M$.

The first embodiment of the method has been described with the assumption that the water depth under the vehicle was known and that the transmission time could be adjusted accordingly to a convenient value.

A second preferred embodiment of the method will be described with reference to FIG. 3 and relates to the case where the water depth is unknown and the time of arrival of waves diffused back is aleatory.

According to the invention it is possible to provide automatically for:

the lengthening of the transmission time up to the arrival of the back diffused waves whereby the accuracy of the measurements is increased as far as possible, the maintenance of a constant ratio between the actual transmission time and the recurrence interval between two successive transmission phases.

The different stages of the method according to the invention are as follows:

at time $t_o$, taken as time origin, there is transmitted a recognition signal in the form of a first wave train during a time T, hereinafter called tonality, after a waiting time interval $\delta$, which is optional but not necessary, a wave train $E_1$, at frequency $f_o$, is transmitted over a time interval $\theta$ (diagram 3a). This transmission is followed with a waiting time $\Delta\theta$ left free for parasitic echos, the receiver is made operative for a time $\tau$ in order to detect the echo of the tonality signal, if any (diagram 3b). The time interval $\tau$ will be called hereinafter watching time.

The values of $\theta$, $\Delta\theta$ and $\tau$ are so adjusted that:

$$\theta + \Delta\theta + \tau = T \qquad (7)$$

In the absence of echo received during the time interval $\tau$, i.e., when the depth is such that time interval $T_{AR}$ for travel of the waves forth and back is greater than the time interval lapsed since the beginning $t_o$ of the transmission, there is transmitted at instant $2T + \delta$ a second wave train $E_2$ at frequency $f_o$ over a time interval $\theta$.

After a waiting time $\Delta\theta$, following the end of this transmission of $E_2$, the receiver is made operative for a further watching interval $\tau$.

If the echo $S'$ of the tonality wave train is received during said second watching interval $\tau$ (diagram 3c), the transmission is interrupted and the operative time $\tau$ of the receivers is extended by a further time interval $T_F$ called reception interval or measuring gap (diagram 3d).

There is thus connected the measuring device which for example counts the number of times where the low-frequency signal, obtained by synchroneous demodulation of the received waves $E'$ has a zero amplitude, i.e., the number of periods of the signal contained in the actual measuring interval.

If no echo is detected within the second watching interval, new wave trains $E_3$, $E_4$ etc... are transmitted.

More generally $n$ is the number of the transmitted wave trains $E_1$, $E_2$ ... $E_n$, following the tonality signal S and $E'_1$, $E'_2$ ... $E'_n$ are the received wave trains. The transmission stage lasts $(n+1) T+\delta$ and the measuring gap $T_F$ is selected of a sufficient duration for receiving the echos of the wave trains transmitted along axes different from the main axis.

The recurrence interval $T_{REP}$ between two successive transmission phases being chosen equal to $3nT$, the interval $T_F$ is determined by the relationship:

$$T_{REP} = (n+1)T + \delta + T_F \qquad (8)$$

In view of the value $T_{REP} = 3nT$ the value of $T_F$ is given by the relationship:

$$T_F/T = (2n-1) - \delta/T \qquad (9)$$

The length of this gap varies as a function of $n$, i.e., as a function of the depth. It is apparent that the gap length is sufficient to contain the n echos $E_1$, $E'_2$ ... $E'_n$.

With the selected value of $T_{REP}$, the scale factor, defined by the ratio of $T_{REP}$ to the actual transmission time $n\theta$, is constant, irrespective of the transmission time, and has the value:

$$F = 3T/\theta \qquad (10)$$

The distance travelled over during the recurrence period $T_{REP}$ is obtained by multiplying the number of passages to a zero value of the signal, counted during the actual transmission time, by F and then by the factor $\lambda/(2 \sin \beta)$ (see relationship 2).

It is apparent that the measurement accuracy will be better when the actual transmission time $n\theta$ is closer to the recurrence interval $T_{REP}$, i.e. when the factor F is closer to 3.

However it is still within the scope of the invention to select more generally a recurrence interval $T_{REP}$ equal to $pnT$ wherein $p$ is an integer higher than 3.

In this case the multiplication factor k is expressed as follows:

$$k = F = pT/\theta \qquad (11)$$

Referring to FIG. 4, let $f_A$ and $f_B$ be the frequencies limiting the pass band $\pi$ of the transducers centered on the transmission frequency $f_o$. Let now $f_m$ and $f_M$ be the frequencies of the waves transmitted at frequency $f_o$ and subjected to a maximum frequency shift by DOPPLER effect, which corresponds to the maximum possible velocity of the carrying vehicle and let $\sigma$ be the width of the band centered on $f_o$ and limited by $f_m$ and $f_M$.

The frequency $f'$ of the tonality wave train preceding the transmission will be selected within the pass band of the transducers so that a frequency band limited by $f'_m$ and $f'_M$ and of a width $\sigma$, centered on $f'$, do not intersect the interval $f_m, f_M$.

Accordingly a transmission at frequency $f'$, subjected to any frequency shift, will arrive at the receiver outside the interval $f_m$, $f_M$ and will be therefore easy to identify.

The identification of the tonality signal will be made easier by constituting said signal by $n$ wave trains ($n$ being any number) simultaneously transmitted at different frequencies ($f'_1, f'_2 \ldots f'_n$) selected with the same limitations as for the selection of $f'$.

It would not be, however, out of the scope of the invention to select a different tonality signal, for example a signal at a frequency $f_o$ or a signal of frequency $f_o$ modulated in frequency.

The preferred device for carrying out the method diagrammatically shown in FIG. 5 and its operation will be further described and illustrated by chronograms of FIG. 6.

The device comprises a transmission assembly I, a receiving assembly II, a counting and viewing assembly III and a sequence controller IV which co-ordinates the various operations of these assemblies.

The transmission assembly comprises on the one hand n oscillators ($1a, 1b \ldots 1n$, $n$ being any number) tuned to different frequencies ($f'_1, f'_2 \ldots f'_n$), which generate a complex tonality signal, and, on the other hand an oscillator 2, tuned to frequency $f_o$.

The group of oscillators $1a, 1b \ldots 1n$ is connected by conductor 17 to the ultrasonic wave transmitting-receiving transducer 3, through relay $K_1$. The sequence controller IV issues a signal $k_1$ actuating relay $K_1$ during a time interval T with a recurrence period $T_{REP}$ (diagram 6a of FIG. 6).

The oscillator 2 is also connected to transducer 3 by means of conductor 18, through a relay $K_2$. After an optional safety delay δ, the sequence controller IV actuates, by a signal $k_2$, the successive closures of $K_2$ with a recurrence period T and during time intervals θ. During these intervals the n wave trains $E_1, E_2 \ldots E_n$ are generated (diagram 6b of FIG. 6).

The receiving device II comprises a set for amplification and detection of the frequency shift due to the DOPPLER effect.

The electric signals produced by transducer 3 are amplified first in a high frequency amplifier 4 whose pass band, centered on frequency $f_o$ is wide enough to give passage to the frequencies forming the tonality complex signal shifted by DOPPLER effect and then in another amplifier 5 with programmed gain.

The latter may be for example an operational amplifier of known type provided with a series of feed back resistances having well defined values.

The gain of amplifier 5 is controlled by a programmed voltage g (diagram 6h of FIG. 6) transmitted from sequence controller IV, through the connecting conductor 21. The voltage g increases by degrees from the time of transmission of the first wave train $E_1$, up to the time of detection of the tonality echo. The gain then remains unchanged until the beginning of the following transmission sequence, at which the gain returns to its minimal value. Since the gain increase which have to compensate for the damping of the acoustic waves through water during the travel time, the voltage will increase by steps which are not necessarily of a steady value.

The output of amplifier 5 is connected to a synchroneous demodulator receiving through conductor 22 the oscillation at frequency $f_o$ produced by oscillator 2, and generating a signal whose frequency corresponds to the frequency difference resulting from the DOPPLER effect.

The output of the demodulator 6 is connected to a limiter 7 reducing any undesired amplitude modulations of the signal. Likewise, the respective positions of limiter 7 and demodulator 6 may be reversed.

Limitor 7 is connected to two relays $K_3$ and $K_4$. Relay $K_3$ is closed by pulses $k_3$ (diagram 6c of FIG. 6) issuing from the sequence controller IV and conveyed through conductor 24. These pulses $k_3$ have a length τ (watching interval) and are sent by the sequence controller within the interval between two successive transmissions E, with a recurrence period T.

Downstream relay $K_3$ is placed a band-pass filter 8a giving a passage only to the frequency band corresponding to the demodulated echos of the tonality signal.

An energy detector 9a of a known type, connected to filter 8a, produces a pulse $r_1$ (diagram 6e of FIG. 6) as soon as it detects a signal during one of the pulses $k_3$.

This pulse $r_1$ is conveyed through conductor 26 to the sequence controller which:

a. interrupts the transmission pulses $k_2$ and pulses $k_3$ provided for the closure of relay $K_3$, b. maintains the gain of amplifier 5 to attained value and prevents any further increase thereof, c. actuates the closure of relay $K_4$ by means of a pulse in the form of a square wave $k_4$ (diagram 6f of FIG. 6), through conductor 25. This pulse, which corresponds to the measurement gap, lasts until the end of the recurrence period $T_{REP}$.

Downstream relay $K_4$ there is placed a low-pass filter 8a giving passage only to the frequencies in the band $f_m$, $f_M$ (see FIG. 4). This filter 8b is connected to a detector 9b for the passages to zero of the amplitude of the low-frequency signals.

The counting and viewing assembly III first of all comprises a counter 10 for the horizontal distance, connected to detector 9b which counts the number of passages to zero of the detected amplitude during the actual reception time $n\theta$. This counter 10 is connected to a visualization element through a scale multiplier 11 which multiplies the number of passages to zero, on the one hand, by the scale factor F and, on the other hand, by the coefficient $\lambda/2\sin\beta$ (β being the angle of inclination of the transmitted beams with respect to the vertical line and λ being the wave length of the transmitted acoustic wave), so as to obtain the horizontal distance travelled over by the vehicle during the recurrence interval $T_{REP}$.

The assembly III also comprises a series of counters for determining the distance from the vehicle to the reference surface.

This assembly comprises an approximation counter 15 connected to the sequence controller through conductor 31, to the detector 9a through conductor 32 and to the output terminal of the sequence controller IV producing pulses $K_2$, through conductor 33.

This counter 15 is triggered by a pulse for reset to zero (RAZ) transmitted with a period $T_{REP}$ at the beginning of each transmission phase and it counts the number of transmitted pulses $k_2$. From this counting it is possible to determine the number n of the transmitted wave trains $E_1, E_2 \ldots E_n$ and consequently the time interval $t_1 = nT$ (diagram 6g of FIG. 6).

The computation is made more accurate by determining the time interval $t_2$ (diagram 6g) between the transmission of the last wave train $E_n$ and the reception of the echo of the first wave train $E'_1$, i.e., the time interval between the pulse $r_1$ and the detection of $E'_1$.

This calculation is performed by counter 13 initiated by pulse $r_1$ conveyed through conductor 32 and stopped at the arrival of signal $E'_1$ in detector 9b to which it is connected through conductor 27.

The time interval $t_2$ is measured by counting the pulses generated by a clock 14 during the operation time interval of counter 13. The result set at counters 15 and 13 is then transferred to a viewing apparatus 16 after multiplication in a scale adaptor 30 converting the time values to values of vertical distance.

Finally, the closure of relay 54 insures the actuation of the sequence controller IV and the reset to zero of the counters of the device at the operation starting time.

In the described device the commutations are performed, by way of example, by means of electromechanical relays $K_1$, $K_2$, $K_3$ and $K_4$. It is also possible, without departing from the scope of the invention, to make use of electronic relays.

The operation of the sequence controller IV will be now illustrated by the chronograms of FIG. 7. The sequence controller IV, diagrammatically shown in FIG. 8, comprises a time base generator formed by an oscillator 34, which produces a sine signal converted to a rectangular wave in a peak limiter 35, the output of which is connected to a frequency divider 36. The signal produced at the output of this divider (diagram 7a) is used as time base for four generators 37, 38, 39 and 40.

Generator 37 produces a square wave $k_1$ of a width T with a recurrence period $T_{REP}$ (diagram 7c).

Generator 38 produces a square wave of a width 2T with a recurrence period $T_{REP}$ (diagram 7f).

Generator 39, self-maintained by a reaction loop, generates a square wave $\theta(t)$ of a width $\theta$, with a recurrence period T (diagram 7d).

Generator 40, also self-maintained, generates a square wave $\theta(t-\tau)$ of a width $\theta$ and a recurrence period T (diagram 7e) with a time shift $\tau$ with respect to that shown in diagram 6d.

The separate generators 37 and 38 may be replaced by a single generator producing, at two different outputs, two square waves of respective width T and 2T.

Similarly the separate generators 39 and 40 may also be replaced by a single generator producing at two different outputs respective recurrent signals $\theta(t)$ and $\theta(t-\tau)$.

The first square wave $E_0$ signal $\theta(t)$ is transmitted with a lag $\delta$ with respect to the time origin. For sake of simplicity this lag $\delta$ will be chosen equal to $\tau$.

The generator 37 controls, during a time interval T from the time origin, the closure of relay $K_1$ and the tonality transmission.

The signal $\bar{k}$, coupled with the signal produced by generator 37, and the signal generated by generator 39 are mixed at an AND gate 41 which produces a recurrent signal $k_2$, the first square wave of which occurs at time $T + \gamma$ after the time origin (diagram 7g).

Signals $\overline{2T}$ and $\theta(t)$, coupled with signals produced by generators 38 and 39, are mixed, at an AND gate 42, with signal $\theta(t-\tau)$ produced by generator 40.

Signal $k_3$ at the output of AND gate 42 has the form of square waves of a width $\tau$ and a recurrence period T (diagram 7a). It is used for actuating relay $K_3$ during watching periods.

The signal $\overline{2T}$, coupled with the signal produced by generator 38, is mixed, in an AND gate 43, with signal $\theta(t)$ produced by generator 39. This gate issues a signal in the form of a square wave of a width $\theta$ and a recurrence period T, shifted by a time interval $2T + \delta$ with respect to the time origin, i.e., simultaneously with the transmission of the square wave $E_2$. n being the number of transmitted square waves E(n is 2 in FIG. 8) the AND gate 43 will issue (n−1) pulses.

The sequence controller also comprises a flip-flop circuit 45 having one conductor 451 to the inputs of AND gates 41, 42 and 43 and its other output actuating, through conductor 452, relay $K_4$.

This flip-flop circuit 45 is actuated by the output signal from an AND gate 44, controlled by the simultaneous arrival of signals $k_3$ and $r_1$ (diagram 7j) produced respectively at gate 42 and detector 9a (FIG. 5) at the time of arrival of the tonality (diagram 7j).

When the flip-flop 45 is actuated, gates 41, 42 and 43 become closed, thus resulting in the end of the transmission phase, and relay $K_4$ is also closed, thus indicating the beginning of the receiving time gap (diagram 7k).

For sake of simplicity the time lag $\delta$ will be given the value $\tau$. The first square wave of signal $\theta(t-\tau)$ (diagram 7e) has a width $\theta$, the beginning of the second square wave and the end of signal $k_1$ occur simultaneously and the beginning of the third square wave is also simultaneous with the end of signal $2k_1$ (diagram 7f).

In this case the transmission stage between the time origin and the beginning of the measuring gap extends over a time $(n+1)T$. The reception stage and consequently the measuring gap must last $(2n-1)T$ in order to obtain a recurrence period $T_{REP} = 3nT$.

This time interval is generated by an assembly connected to the output of gate 43 and which comprises successively a counter 46 where are numbered $(n-1)E$ signals, a multiplier 47 producing at its output a signal corresponding to $(2n-2)E$ and an adder 48 which automatically adds a pulse indicative of the end of the counting period and issues a signal corresponding to $(2n-1)E$.

Generator 39 is connected by conductor 391 to a counter 49, through an AND gate 51 opened at time $(n+1)T$ by signal $r_1$. The counter $C_2$ counts the successive signals E produced by the generator.

A coincidence circuit 50 connected between adder 48 and counter 49 produces a signal for reset to zero (RAZ) (diagram 7b) when $(2n-1)$ square waves E have been counted by the latter. This signal RAZ resets to zero the counters 46 and 49 through conductors 501 and 502 and, by means of conductor 503, through an OR gate 52, triggers the flip-flop 45 so as to open relay $K_4$ and to unlock AND gates 41, 42 and 43.

The signal for reset to zero is supplied to four generators 37, 38, 39 and 40 by means of conductor 531, through an OR gate 53 and determines the initial time of a new transmission and reception cycle.

The two OR gates 52 and 53 are also connected to a relay 54, the closure of which insures the actuation and the reset to zero of the different counters at the beginning of the operations.

The sequence controller IV comprises, finally, a circuit for generating a gain program with quantified stages, connected to amplifier 5 through conductor 21 (FIG. 5).

This circuit comprises a digital-analogical converter 54 connected to the output terminal of counter 46 and a gain program generator 55 connected to the output of the converter.

These two elements produce a gain program the variations of which occur at the successive instants at which the AND gate 43 issues pulses.

The way of connecting said circuit is not limitative. According to the selected gain, this circuit will be connected at a point of the device where are generated n or $(n+1)$ pulses during the transmission phase, depending whether it is desired to increase the gain as soon as the first wave train $E_1$ is transmitted or as soon as the tonality is transmitted.

The invention has been described with reference to the particular case where frequency shift measurements are carried out on acoustic waves transmitted from a vehicle moving in or on water. It would not be out of the scope of this invention to apply the method and apparatus according to the invention to the case of a vehicle moving in any medium and with the use of elastic or electromagnetic waves.

More generally it is clear that one skilled in the art can easily ascertain, from the foregoing description, the essential characteristics of this invention and, without departing from the spirit and scope thereof, can make various changes and modifications of the invention to adapt it to various usages and conditions.

Consequently, such changes and modifications are properly, equitably and intended to be within the full range of equivalence of the following claims.

What we claim as this invention is:

1. A method for determining the distance travelled over by a vehicle with respect to a reference surface, comprising a stage of transmitting waves of a determined frequency towards said surface, in an oblique direction with respect to a vertical line and a stage of receiving the waves reflected from said surface during which the received waves are converted to electrical values and the distance travelled over is determined on the basis of the difference between the frequency of the transmitted waves and that of the received waves, said method being performed by means of the following operations:
   a. the transmission of a sequence formed of n wave trains having each a constant length $\theta$ and with a predetermined recurrence period,
   b. the interruption of the transmission stage substantially at the time of arrival of the waves reflected from said surface, the number $n$ of the transmitted wave trains being an integer,
   c. the extension of the transmission stage by a reception stage the length of which depends on the value of $n$, and
   d. the maintenance of a constant ratio, independent from the value of $n$, between the recurrence period $T_{REP}$ of two successive transmission sequences and the actual transmission time $n\theta$ of said sequence.

2. A method according to claim 1, wherein during the transmission stage, the sequence of transmitted wave trains is preceded by a recognition signal.

3. A method according to claim 2, wherein the duration T of the recognition signal is equal to the recurrence period of the wave trains.

4. A method according to claim 1, wherein the ratio between the recurrence period $T_{REP}$ and the actual transmission time $n\theta$, is proportional to the ratio between the recurrence period T of two successive wave trains and the length $\theta$ of each wave train.

5. A method according to claim 1, wherein the ratio between the recurrence period $T_{REP}$ and the actual transmission time interval $n\theta$ is three times the ratio between the recurrence period T of two successive wave trains and the length $\theta$ of each wave train.

6. A method according to claim 1, wherein a reception time interval is interposed between the transmission time intervals of two successive wave trains for detecting the arrival of the echo of the transmitted wave trains.

7. A method according to claim 2, wherein a reception time interval is interposed between the transmission time intervals of two successive wave trains, for receiving the arrival of the recognition signal echo, and the reception stage is initiated after detection of the echo of said signal during said interval.

8. A method according to claim 7 wherein the recognition signal has a duration T equal to the recurrence period of two successive wave trains.

9. A device for determining the distance travelled over by a vehicle with respect to a reference surface wherein a recognition signal is transmitted and waves of a determined frequency are transmitted towards the surface in an oblique direction to a vertical line, received waves reflected from the surface are converted to electrical values and the distance travelled over is determined on the basis of the difference between the frequency of the transmitted waves and that of the received waves, the device comprising a transmission assembly, a reception assembly, an assembly for measurement of distances and a sequence controller for co-ordinating the operations performed by said assemblies, wherein:
   a. the transmission assembly comprises an oscillator for the generation of the wave trains, at least one oscillator for the generation of the recognition signal and switching means for sequential electric connection of the oscillators with at least one transmitting transducer.
   b. the reception assembly comprises a demodulation set, connected to a receiving transducer and producing signals at a frequency equal to the difference between the respective frequencies of the transmitted and the received waves, a set for detection of the recognition signal, intermittently connected to the demodulation set during the reception time intervals through a first switching means controlled by the sequence controller and a set for detection of the received wave trains, connected to the demodulation set, during the first reception stage, through a second switching means controlled by the sequence controller,
   c. the measuring assembly comprises counting means and means for converting said frequency difference to units of the distance travelled over, said last means being connected to the set for detection of the received wave trains.

10. A device according to claim 9, wherein the set for detecting the received wave trains comprises a detector of the passages to a zero amplitude value of the oscillations forming said wave trains.

11. A device according to claim 9 wherein the sequence controller is connected to the output of the set for detection of the recognition signal and comprises means for controlling, at the reception of the said signal, the actuation of said set for detection of the received wave trains.

12. A device according to claim 9 comprising a set of counters for measuring the time interval between the instants at which begin respectively the transmission and the reception of the first transmitted wave train.

13. A device according to claim 12, wherein the set of counters comprises a first counter controlled by the sequence controller and connected to the output terminal of the set for detection of the recognition signal for measuring the time interval between the beginning of the measuring stage and the time of transmission of the first wave train, a second counter connected to the output terminal of the set for detection of the recognition signal and to the output terminal of the set for detection of the received wave trains, for measuring the time interval between the time of reception of the first transmitted wave train and the beginning of the measuring stage, and means for summing and converting said intervals to distance units, connected to the output terminal of two counters.

14. A device according to claim 9 wherein the demodulation set comprises an amplifier of variable gain connected to the sequence controller which comprises a circuit for generating a stagewise increasing gain program at times of transmission of the successive wave trains.

15. A device according to claim 9 wherein the set for detection of the recognition signal comprises a signal detector producing a pulse at the reception of said recognition signal.

16. A device according to claim 9 wherein the sequence controller comprises means for generating signals of a length T and signals of a length 2T with a recurrence period $T_{REP}$, means for generating a first recurrent signal of a length $\theta$ and a recurrence period T and a second signal identical to the latter and delayed by a time interval equal to the reception time interval, means for combining the signal of length T with the first recurrent signal and issuing a first signal for controlling the switching means associated to the oscillator for the transmission of the wave trains, means for combining signals of length T and 2T with the second recurrent signal and producing a second signal for controlling the switching means associated to said set for detection of the recognition signal, means for combining the signal of length 2T and the first recurrent signal and producing a third recurrent control signal with a recurrence period T and beginning at the instant of transmission of the second wave train, a locking system, controlled by the arrival of the recognition signal, which locks said means for combining and controls the closure of the switching means associated to the set for detection of the received wave trains, an apparatus producing a readjustment pulse at the end of the measurement stage, connected to the output terminal of said means for combining which produce the third control signal, and means, also connected to said last output terminal, producing a gain program which varies at the instants of transmission of said third control signal.

17. A device according to claim 16 wherein the apparatus producing the readjustment pulses comprises a first counter summing the number of successive pulses of the third control signal, a multiplier connected to the first counter and doubling the set number of pulses, an adder connected to the multiplier for substracting one pulse, a second counter connected to the means for generating the first recurrent signal through an AND gate unlocked by the arrival of the recognition signal, a coincidence circuit connected to the adder output terminal and to the second counter output terminal, comparing the number of pulses set at said second counter and the pulses produced at the output terminal of said adder and generating said readjustement pulses in case of coincidence.

18. A device according to claim 16, wherein the locking system comprises a flip-flop circuit having one output terminal connected to the input terminals of said means for combining and an output terminal connected to the switching means associated to the set for detection of the wave trains, said flip-flop circuit being actuated by the readjustement signal and by the recognition signal detector.

* * * * *